(12) United States Patent
Park et al.

(10) Patent No.: US 11,431,019 B2
(45) Date of Patent: Aug. 30, 2022

(54) LITHIUM SECONDARY BATTERY

(71) Applicant: LG CHEM, LTD., Seoul (KR)

(72) Inventors: Eunkyung Park, Daejeon (KR); Minchul Jang, Daejeon (KR); Changhun Park, Daejeon (KR); Doyeon Kim, Daejeon (KR); Bora Jung, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 157 days.

(21) Appl. No.: 16/623,500

(22) PCT Filed: Jun. 26, 2018

(86) PCT No.: PCT/KR2018/007227
§ 371 (c)(1),
(2) Date: Dec. 17, 2019

(87) PCT Pub. No.: WO2019/004699
PCT Pub. Date: Jan. 3, 2019

(65) Prior Publication Data
US 2020/0203757 A1    Jun. 25, 2020

(30) Foreign Application Priority Data

Jun. 26, 2017   (KR) .................. 10-2017-0080332
Jun. 25, 2018   (KR) .................. 10-2018-0072890

(51) Int. Cl.
*H01M 4/36* (2006.01)
*H01M 4/62* (2006.01)
(Continued)

(52) U.S. Cl.
CPC ......... *H01M 10/052* (2013.01); *H01M 4/366* (2013.01); *H01M 4/628* (2013.01);
(Continued)

(58) Field of Classification Search
CPC .......... H01M 4/80; H01M 4/36; H01M 4/545; H01M 4/505; H01M 4/48; H01M 4/58
See application file for complete search history.

(56) References Cited

U.S. PATENT DOCUMENTS

| | | |
|---|---|---|
| 2002/0018935 A1 | 2/2002 | Okada |
| 2005/0147883 A1 | 7/2005 | Kubota |

(Continued)

FOREIGN PATENT DOCUMENTS

| | | |
|---|---|---|
| CN | 1332484 A | 1/2002 |
| CN | 103560265 A | 2/2014 |

(Continued)

OTHER PUBLICATIONS

Extended European Search Report for European Application No. 18823493.4, dated Apr. 28, 2020.

(Continued)

*Primary Examiner* — Kenneth J Douyette
(74) *Attorney, Agent, or Firm* — Birch, Stewart, Kolasch & Birch, LLP

(57) ABSTRACT

A lithium secondary battery which is made of an anode-free battery and comprises lithium metal formed on a negative electrode current collector by charging. The lithium secondary battery comprises the lithium metal formed in a state of being shielded from the atmosphere, so that the generation of a surface oxide layer (native layer) formed on the negative electrode according to the prior art does not occur fundamentally, thereby preventing the deterioration of the efficiency and life characteristics of the battery.

13 Claims, 4 Drawing Sheets

(51) Int. Cl.
    *H01M 10/052*     (2010.01)
    *H01M 10/0525*    (2010.01)
    *H01M 10/0565*    (2010.01)
    *H01M 4/02*       (2006.01)

(52) U.S. Cl.
    CPC .. *H01M 10/0565* (2013.01); *H01M 2004/021* (2013.01); *H01M 2300/0085* (2013.01)

(56) References Cited

U.S. PATENT DOCUMENTS

| | | | |
|---|---|---|---|
| 2006/0228626 A1* | 10/2006 | Kawashima | H01M 10/4235 429/200 |
| 2011/0256456 A1 | 10/2011 | Jeon et al. | |
| 2013/0017441 A1 | 1/2013 | Affinito et al. | |
| 2013/0260257 A1 | 10/2013 | Choi | |
| 2014/0093774 A1 | 4/2014 | Yoon | |
| 2016/0261000 A1 | 9/2016 | Zhang et al. | |
| 2016/0351889 A1* | 12/2016 | Swonger | A61F 5/566 |
| 2017/0104209 A1 | 4/2017 | Son et al. | |
| 2017/0133660 A1 | 5/2017 | Kurihara et al. | |
| 2018/0034101 A1 | 2/2018 | Lee et al. | |

FOREIGN PATENT DOCUMENTS

| | | |
|---|---|---|
| CN | 103718337 A | 4/2014 |
| JP | 9-283125 A | 10/1997 |
| JP | 11-307129 A | 11/1999 |
| JP | 2002-237293 A | 8/2002 |
| JP | 2004-220819 A | 8/2004 |
| JP | 2006-120337 A | 5/2006 |
| JP | 2007-258029 A | 10/2007 |
| JP | 2014-520370 A | 8/2014 |
| JP | 2016-91984 A | 5/2016 |
| KR | 10-2013-0111833 A | 10/2013 |
| KR | 10-1336943 B1 | 12/2013 |
| KR | 10-2015-0143372 A | 12/2015 |
| KR | 10-2016-0052323 A | 5/2016 |
| KR | 10-1648465 B1 | 8/2016 |
| KR | 10-2016-0138120 A | 12/2016 |

OTHER PUBLICATIONS

International Search Report for PCT/KR2018/007227 dated Sep. 27, 2018.
Qian et al., "Anode-Free Rechargeable Lithium Metal Batteries", Advanced Functional Materials, 2016, Vo. 26, pp. 7094-7102.
Qian et al., "High rate and stable cycling of lithium metal anode", Nature Communications, Feb. 20, 2015, vol. 6, 6362, total 9 pages.
Yan et al., "Ultrathin Two-Dimensional Atomic Crystals as Stable Interfacial Layer for Improvement of Lithium Metal Anode", Nano Letters, 2014, vol. 14, pp. 6016-6022.

\* cited by examiner

【Figure 1】
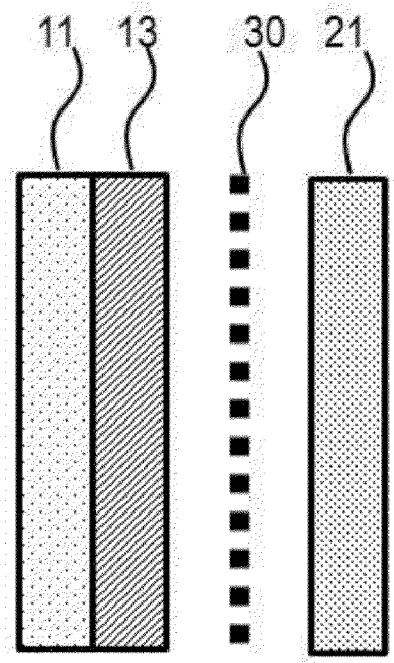
【Figure 2】
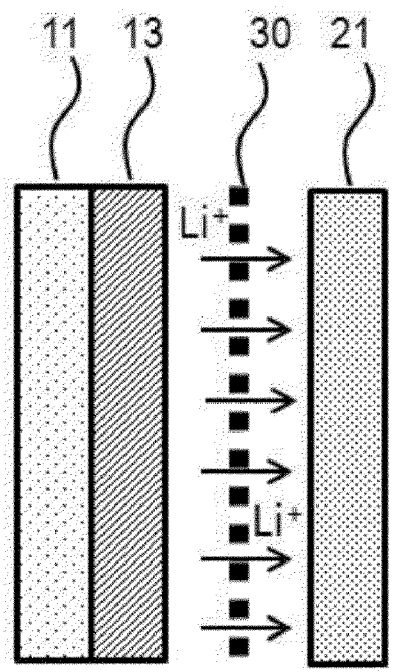

【Figure 3】
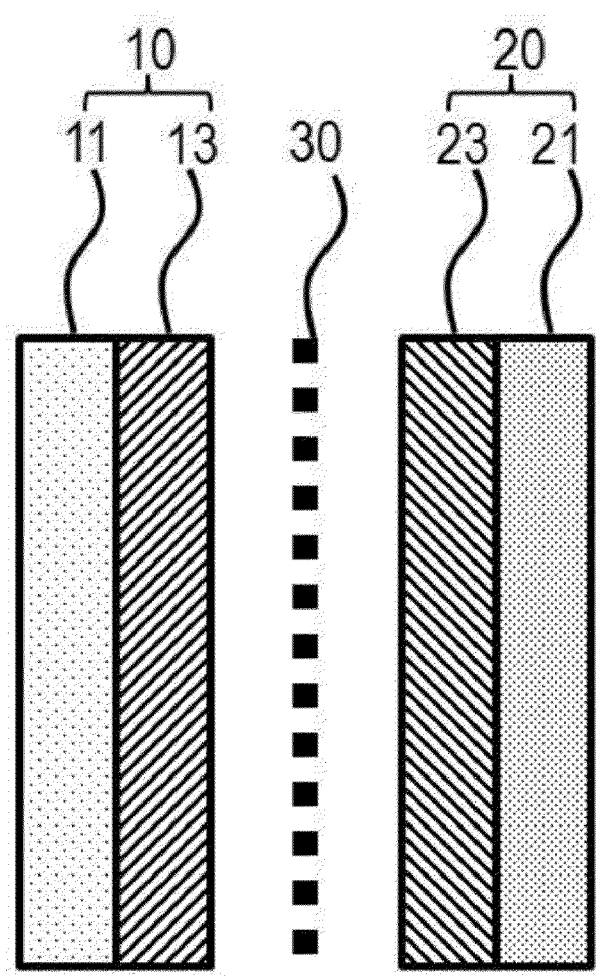

【Figure 4】
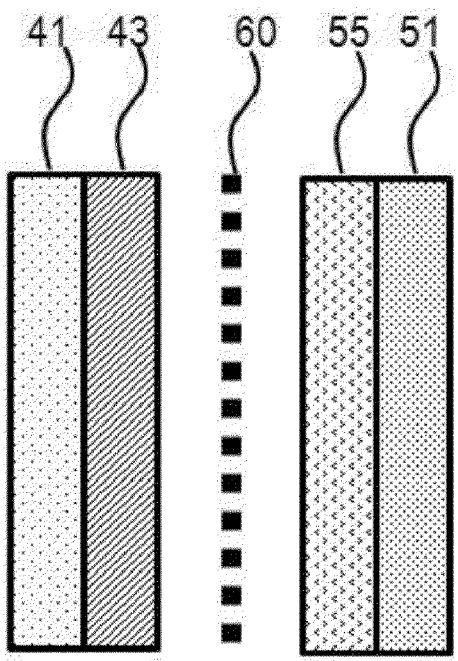
【Figure 5】
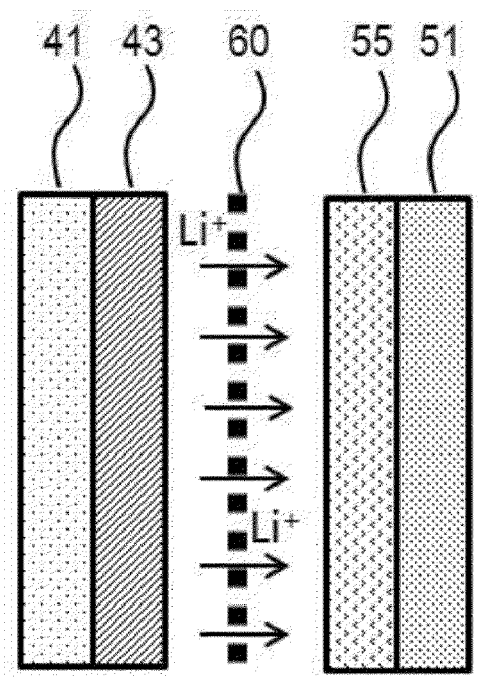

【Figure 6】
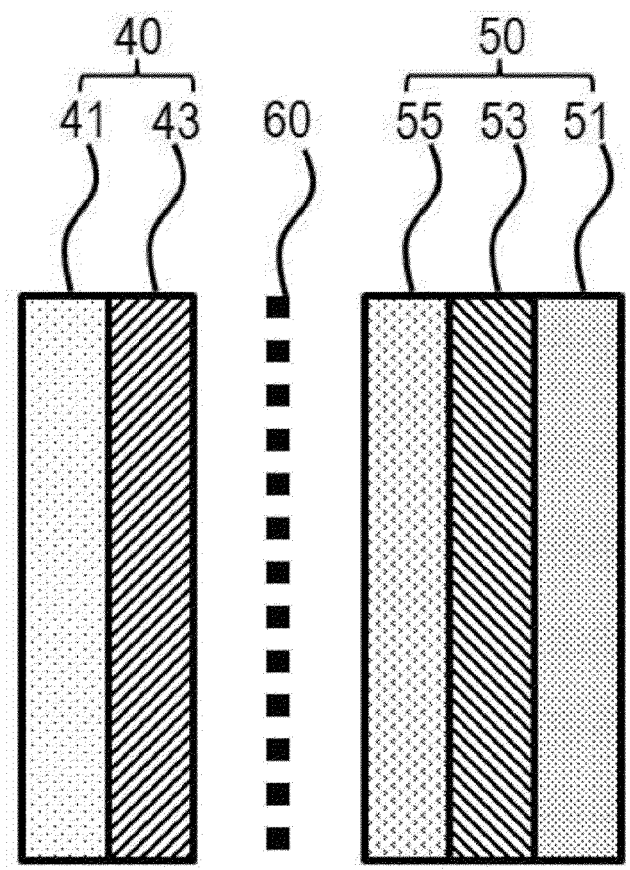

LITHIUM SECONDARY BATTERY

TECHNICAL FIELD

This application claims the benefits of priorities based on Korean Patent Application No. 10-2017-0080332, filed on Jun. 26, 2017 and Korean Patent Application No. 10-2018-0072890, filed on Jun. 25, 2018, the entire contents of which are incorporated herein by reference.

The present invention relates to a lithium secondary battery having an anode free structure using a gel polymer electrolyte.

BACKGROUND ART

Recently, various devices that require batteries, such as mobile phones, wireless household appliances, and electric vehicles, are being developed. With the development of these devices, the demand for the secondary battery is also increasing. Particularly, along with the miniaturization tendency of electronic products, the secondary batteries are also becoming lighter and smaller.

In accordance with this trend, recently, a lithium secondary battery, which uses lithium metal as an active material, has attracted attention. Lithium metal has the characteristics of low redox potential (−3.045 V vs. standard hydrogen electrode) and high weight energy density (3,860 mAhg-1), so it is expected as a negative electrode material for the high capacity secondary battery However, when lithium metal is used as a negative electrode of the battery, the battery is manufactured by attaching a lithium foil to the current collector on a planar surface, but lithium is an alkali metal which reacts explosively with water and reacts with oxygen in the atmosphere because of its high reactivity, and thus has a disadvantage in that it is difficult to manufacture and use in a normal environment. In particular, when lithium metal is exposed to the atmosphere, an oxide layer such as LiOH, $Li_2O$, $Li_2CO_3$ and the like is formed as a result of oxidation. When the surface oxide layer (native layer) is present on the surface, the oxide layer acts as an insulating film, and thus there arise problems that the electric conductivity is lowered, and the smooth movement of the lithium ions is inhibited, thereby increasing the electric resistance For this reason, although the problem of surface oxide layer formation due to the reactivity of lithium metal was partially improved by performing a vacuum deposition process to form a lithium negative electrode, it is still exposed to the atmosphere in the battery assembly process, and it is impossible to fundamentally inhibit the formation of the surface oxide layer. Therefore, it is required to develop a lithium metal electrode which can solve the reactivity problem of lithium while improving the energy efficiency by using lithium metal and can simplify the process more easily.

PATENT LITERATURE

Korean Patent Application Laid-Open Publication No. 10-2016-0052323, "Lithium electrode and lithium battery containing the same"

DISCLOSURE

Technical Problem

In order to solve the above problems, the inventors of the present invention have conducted various studies and as a result have designed an anode-free battery structure capable of forming a lithium metal layer on a negative electrode current collector by lithium ions transferred from a positive electrode active material by charging after assembling the battery in order to prevent the contact of lithium metal with atmosphere at the time of assembling the battery and developed a positive electrode active material composition capable of stably forming the lithium metal layer.

Accordingly, it is an object of the present invention to provide a lithium secondary battery having improved performance and service life by solving the problem caused by the reactivity of lithium metal and the problems occurring in the assembly process.

Technical Solution

In order to achieve the above object, the present invention provides a lithium secondary battery comprising a positive electrode, a negative electrode, and a separator and an electrolyte interposed therebetween, wherein the electrolyte is a gel polymer electrolyte and lithium metal is formed on the negative electrode current collector in the negative electrode by moving from the positive electrode through initial charging.

At this time, the lithium metal is formed through one-time charge at a voltage of 4.5V to 2.5V.

In addition, the negative electrode current collector may further comprise a protective layer formed on the surface in contact with the separator.

Advantageous Effects

The lithium secondary battery according to the present invention is coated in a state of being shielded from the atmosphere through the process of forming a lithium metal layer on the negative electrode current collector, and thus can inhibit the formation of the surface oxide layer of lithium metal due to atmospheric oxygen and moisture, and consequently has an effect of improving cycle life characteristics.

DESCRIPTION OF DRAWINGS

FIG. 1 is a schematic diagram of a lithium secondary battery manufactured according to the first embodiment of the present invention.

FIG. 2 is a schematic diagram showing the migration of lithium ions ($Li^+$) during the initial charging of a lithium secondary battery manufactured according to the first embodiment of the present invention.

FIG. 3 is a schematic diagram of a lithium secondary battery manufactured according to the first embodiment of the present invention after initial charging was completed FIG. 4 is a schematic diagram of a lithium secondary battery manufactured according to the second embodiment of the present invention.

FIG. 5 is a schematic diagram showing the migration of lithium ions ($Li^+$) during the initial charging of a lithium secondary battery manufactured according to the second embodiment of the present invention.

FIG. 6 is a schematic diagram of a lithium secondary battery manufactured according to the second embodiment of the present invention after initial charging was completed.

BEST MODE

Hereinafter, the present invention will now be described more fully with reference to the accompanying drawings to be readily carried out by one of ordinary skill in the art. The present invention may, however, be embodied in many different forms and should not be construed as limited to the embodiments set forth herein.

In the drawings, parts not related to the description were omitted in order to clearly illustrate the present invention, and similar reference numerals have been used for like parts throughout the specification. Also, the size and relative size of the components shown in the figures are independent of the actual scale and may be reduced or exaggerated for clarity of description.

FIG. 1 is a cross-sectional view of a lithium secondary battery manufactured according to the first embodiment of the present invention, which comprises a positive electrode comprising a positive electrode current collector 11 and a positive electrode mixture 12; a negative electrode comprising a negative electrode current collector 21; and a separator 30 and an electrolyte (not shown) interposed therebetween.

The negative electrode of the lithium secondary battery is typically constructed by forming a negative electrode on a negative electrode current collector 21. However, in the present invention, an anode-free battery structure is assembled by using only a negative electrode current collector 21, and then lithium ions released from the positive electrode mixture 13 by charging form a lithium metal layer (not shown) as a negative electrode mixture on the negative electrode current collector 21, and thus the negative electrode having the structure of the known negative electrode current collector/negative electrode assembly is formed to constitute the typical lithium secondary battery.

That is, the term, an anode-free battery as used in the present invention may refer to a battery which is free of an anode, in which no negative electrode is formed on the negative electrode current collector during the initial assembly, and it may be a concept that comprises all of the batteries which may have a negative electrode which is formed on the negative electrode current collector upon using.

In addition, in the negative electrode of the present invention, the form of the lithium metal formed as a negative electrode mixture on the negative electrode current collector comprises both a form, in which lithium metal is layered, and a form, in which lithium metal is not layered, (for example, a structure in which lithium metal is aggregated in the form of particle).

Hereinafter, the present invention will be described on the basis of the form of the lithium metal layer 23, in which lithium metal is layered, but it is clear that the description does not exclude structures other than the form in which lithium metal is layered.

FIG. 2 is a schematic diagram showing the migration of lithium ions (Li$^+$) during the initial charging of a lithium secondary battery manufactured according to the first embodiment of the present invention, and FIG. 3 is a schematic diagram of a lithium secondary battery manufactured according to the first embodiment of the present invention after initial charging was completed.

Referring to FIGS. 2 and 3, when the charging is proceeded by applying a voltage higher than a certain level to the lithium secondary battery having the anode free battery structure, lithium ions are removed from the positive electrode mixture 13 in the positive electrode 10 and pass through the separator 30 and migrate toward the negative electrode current collector 21, thereby forming a lithium metal layer 23 consisting purely of lithium on the negative electrode current collector 21 to constitute a negative electrode 20.

The formation of the lithium metal layer 23 through such charging has advantages in that a layer of a thin film may be formed and it is very easy to control the interface characteristics, in comparison with the negative electrode formed by sputtering the lithium metal layer 23 on the negative electrode current collector 21 or by laminating the lithium foil and the negative electrode current collector 21 according to the prior art. In addition, since the bonding strength of the lithium metal layer 23 laminated on the negative electrode current collector 21 is large and stable, the problem of being removed from the negative electrode current collector 21 due to ionization again through discharging does not occur.

In particular, since the anode-free battery structure is formed and thus lithium metal is not exposed to the atmosphere during the assembling process of the battery, conventional problems such as formation of the oxide layer on the surface due to the high reactivity of lithium itself and thus deterioration of the service life of the lithium secondary battery can be fundamentally blocked.

In order to ensure the above-mentioned effect, a gel polymer electrolyte is used as an electrolyte in the negative electrode pre-battery structure of the present invention. The efficiency of lithium metal is 99% or more in the case of the ether-based electrolyte and 95% or less in the case of the carbonate-based electrolyte, which are the most widely used conventional electrolyte. However, the ether-based electrolyte has a disadvantage that it cannot be used for a high-voltage negative electrode due to its low high-voltage stability and the carbonate-based electrolyte has a disadvantage that it has a low reduction stability and thus continuously reacts with lithium, thereby lowering the efficiency and service life of the battery. Therefore, in the case of the crosslinked gel polymer electrolyte of the present invention, the crosslinking structure can inhibit the decomposition of the electrolyte when applied to the high-voltage negative electrode, and it is possible to suppress the growth of the Li dendrite and the generation of dead lithium (dead Li) during the charging/discharging cycle by controlling the mechanical strength against the electrolytic solution, thereby improving the battery life and the battery stability.

The gel polymer electrolyte comprises a polymer matrix, a lithium salt, and an organic solvent, and comprises a crosslinked or non-crosslinked structure, preferably a crosslinked gel polymer electrolyte.

The polymer matrix may comprise a functional group selected from the group consisting of a carboxylic group, an acrylate group and a cyano group in the molecular structure, and preferably, may comprise the acrylate group.

In addition, the polymer matrix may be one containing at least one polymerizable or crosslinkable functional group in the molecular structure.

The monomer having one functional group is not limited in its kind, but may be methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, carboxyethyl acrylate, methyl cyanoacrylate, ethyl cyanoacrylate, ethyl cyano ethoxyacrylate, cyano acrylic acid, hydroxyethyl metacrylate, hydroxypropyl acrylate, vinyl chloride, vinyl fluoride and the like.

The monomer having two functional groups is not limited in its kind, but may be trimethylolpropane ethoxylate triacrylate, polyethylene glycol dimethacrylate, trimethylolpropane trimethacrylate, ethoxylated bisphenol A dimethacrylate, divinyl benzene and the like.

The monomer having three functional groups may be trimethylolpropane-ethocylate triacrylate, acrylic acid, trimethylolpropane-ethocylate triacrylate and the like.

The lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, lithium chloroborane, lithium lower aliphatic carboxylate, lithium 4-phenyl borate, lithium imide and the like.

The concentration of said dissociable salt to the organic solvent may be from 0.1 to 5.0 M. In this case, the gel polymer electrolyte may be in the form of gel and may have a suitable viscosity, and the dissociable salt may be dissolved in the organic solvent to contribute to effective migration of lithium ions.

In addition, as the solvent of the electrolyte solution used according to one embodiment of the present invention, those commonly used in the electrolyte for the lithium secondary battery can be used without limitation, and for example, ethers, esters, amides, linear carbonates, and cyclic carbonates, etc. may be used alone or in combination of two or more thereof.

Among them, carbonate compounds which are cyclic carbonates, linear carbonates, or a mixture thereof may be representatively included.

Specific examples of the cyclic carbonate compound may comprise any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more thereof. In addition, specific examples of the linear carbonate compound may representatively comprise, but is not limited to, any one selected from the group consisting of dimethyl carbonate (DMC), diethyl carbonate (DEC), dipropyl carbonate (DPC), ethyl methyl carbonate (EMC), methyl propyl carbonate (MPC) and ethyl propyl carbonate (EPC) or a mixture of two or more thereof.

Especially, among the solvents for the carbonate-based electrolyte solution, cyclic carbonates such as ethylene carbonate and propylene carbonate may be preferably used since they are highly viscous organic solvents having high dielectric constant and thus the lithium salt in the electrolyte solution can be more easily dissociated. When such cyclic carbonates are mixed with the linear carbonates having a low viscosity and low dielectric constant, such as ethylmethyl carbonate, diethyl carbonate or dimethyl carbonate in an appropriate ratio, it is possible to make an electrolyte solution having a high electric conductivity and thus it can be more preferably used.

In addition, the esters among the solvents for the electrolyte solution may comprise, but are not limited to, any one selected from the group consisting of methyl acetate, ethyl acetate, propyl acetate, methyl propionate, ethyl propionate, γ-butyrolactone, γ-valerolactone, γ-caprolactone, α-valerolactone and ε-caprolactone, or a mixture of two or more thereof.

For crosslinking, conventional crosslinking agents or initiators can be used.

Non-limiting examples of initiators may comprise, but are not limited to, organic peroxides and hydroperoxides such as benzoyl peroxide, acetyl peroxide, dilauryl peroxide, di-tert-butyl peroxide, t-butyl peroxy-2-ethyl-hexanoate, cumyl hydroperoxide, hydrogen peroxide, or azo compounds such as 2,2'-azobis (2-cyanobutane), 2,2'-azobis(methylbutyronitrile), AIBN (2,2'-azobis(iso-butyronitrile)) and AMVN (2,2'-azobisdimethyl-Valeronitrile).

For example, the gel polymer electrolyte according to the present invention is prepared by a method for producing the gel polymer electrolyte, which comprises combining the crosslinkable monomer, the dissociable salt, and the organic solvent to produce a precursor composition; and crosslinking the three or more different crosslinkable monomers by applying heat or ultraviolet rays to the precursor composition, wherein when the three or more different crosslinkable monomers are crosslinked, a crosslinked polymer matrix having a net structure is formed. This corresponds to a method for producing a gel polymer electrolyte having the above characteristics by a simple thermal crosslinking or photo-crosslinking process.

The negative electrode current collector 21, in which the lithium metal layer 23 can be formed by charging, is not particularly limited as long as it has electrical conductivity without causing chemical change in the lithium secondary battery. The examples thereof may be copper, stainless steel, aluminum, nickel, titanium, sintered carbon, or aluminum or stainless steel surface-treated with carbon, nickel, titanium, silver or the like, or aluminum-cadmium alloy.

Also, like the positive electrode current collector 11, the negative electrode current collector 21 may be used in various forms such as film, sheet, foil, net, porous substance, foam or nonwoven fabric having fine irregularities formed on its surface.

Meanwhile, the positive electrode mixture 13 may be composed of various positive electrode active materials depending on the type of the battery. The positive electrode active material used in the present invention is not particularly limited as long as it is a material capable of occluding and releasing lithium ions. However, a lithium transition metal oxide is typically used as a positive electrode active material capable of realizing battery with excellent life characteristics and charging/discharging efficiency.

The lithium transition metal oxide may be, but is not limited to, a layered compound, for example, lithium cobalt oxide (LiCoO$_2$) or lithium nickel oxide (LiNiO$_2$) substituted with one or more transition metals, which contains at least two transition metals; lithium manganese oxide, lithium nickel-based oxide, spinel-based lithium manganese composite oxide, spinel-based lithium manganese oxide in which a portion of Li in formula is replaced with an alkaline earth metal ion, olivine-based lithium metal phosphate and the like, which were substituted with one or more transition metals.

It is preferable to use a lithium-containing transition metal oxide. For example, the lithium-containing transition metal oxide may be at least one selected from the group consisting of LiCoO$_2$, LiNiO$_2$, LiMnO$_2$, LiMn$_2$O$_4$, Li$_2$NiO$_2$, Li(Ni$_a$Co$_b$Mn$_c$) O$_2$ (0<a<1, 0<b<1, 0<c<1, a+b+c=1), LiNi$_{1-Y}$Co$_y$O$_2$, LiCo$_{1-Y}$MnYO$_2$, LiNi$_{1-Y}$MnYO$_2$ (wherein 0=Y<1), Li(Ni$_a$Co$_b$Mn$_c$)$_4$ (0<a<2, 0<b<2, 0<c<2, a+b+c=2), LiMn$_{2-z}$Ni$_z$O$_4$, LiMn$_{2-z}$Co$_z$O$_4$ (wherein 0<Z<2), Li$_x$M$_y$Mn$_{2-y}$O$_{4-z}$A$_z$ (wherein 0.9≤x≤1.2, 0<y<2, 0≤z<0.2, M=at least one of Al, Mg, Ni, Co, Fe, Cr, V, Ti, Cu, B, Ca, Zn, Zr, Nb, Mo, Sr, Sb, W, Ti and Bi, and A is at least one −1-valent or −2-valent anion), Li$_{1+a}$NibM'$_{1-b}$O$_{2-c}$A'$_c$ (wherein 0≤a≤0.1, 0≤b≤0.8, and 0≤c<0.2, M' is at least one selected from the group consisting of stable 6-coordination elements such as Mn, Co, Mg, Al and the like, and A' is at least one −1 valent or −2 valent anion), LiCoPO$_4$, and LiFePO$_4$, and preferably LiCoO$_2$ may be used. In addition to the oxide, sulfide, selenide and halide can also be used.

The lithium transition metal oxide is used as positive electrode active material in a positive electrode mixture 13 together with a binder and a conductive material. In the anode-free battery structure of the present invention, the lithium source for forming the lithium metal layer 23 is the lithium transition metal oxide. That is, the lithium ions in the lithium transition metal oxide are desorbed to form a lithium metal layer 23 on the negative electrode current collector 21, when performing charging in a certain range of voltage range.

However, in fact, since the lithium ion in the lithium transition metal oxide is not easily self-desorbed and there is no lithium that can be associated at the operating voltage level, in addition to charging/discharging, the formation of the lithium metal layer 23 is very difficult, and when only the lithium transition metal oxide is used, since the irreversible capacity is greatly reduced, there arises a problem that the capacity and life characteristics of the lithium secondary battery are degraded.

Therefore, the present invention uses a lithium metal compound together, as an additive capable of providing a lithium source to the lithium transition metal oxide, which is a high-irreversible material having initial charging capacity of 200 mAh/g or more, or initial irreversibility of 30% or more when performing a single charging at 0.01 to 0.2 C in a voltage range of 4.5 V to 2.5 V.

The term 'high-irreversible material' referred to in the present invention can be used in the same sense as the other term 'large-capacity irreversible material', and this means a material having a high ratio of the irreversible capacity of the first cycle of charging/discharging, i.e., "(first cycle charging capacity−first cycle discharging capacity)/first cycle charging capacity". That is, the high-irreversible materials can provide an irreversibly excessive amount of lithium ions during the first cycle of charging/discharging. For example, the high-irreversible material can be a positive electrode material with a large irreversible capacity at the first cycle of charging/discharging (first cycle charging capacity−first cycle discharging capacity) among lithium transition metal compounds that can occlude and release lithium ions.

The irreversible capacity of the commonly used positive electrode active material is about 2 to 10% of the initial charging capacity. However, in the present invention, the lithium metal compound which is a high-irreversible material, that is, a lithium metal compound having an initial irreversible capacity of 30% or more, preferably 50% or more of the initial charging capacity can be used together. In addition, the lithium metal compound having an initial charging capacity of 200 mAh/g or more, preferably 230 mAh/g or more may be used. Such a lithium metal compound plays a role as a lithium source capable of forming the lithium metal layer 23 while increasing the irreversible capacity of the lithium transition metal oxide, a positive electrode active material.

The lithium metal compounds proposed in the present invention can be compounds represented by the following Formula 1 to Formula 8.

$$Li_2Ni_{1-a}M^1{}_aO_2 \qquad \text{[Formula 1]}$$

(wherein 0≤a<1, and M¹ is at least one element Mn, Fe, Co, Cu, Zn, Mg and Cd);

$$Li_{2+b}Ni_{1-c}M^2{}_cO_{2+d} \qquad \text{[Formula 2]}$$

(wherein −0.5≤b<0.5, 0≤c≤1, and 0≤d<0.3, and M² is at least one element selected from the group consisting of P, B, C, Al, Sc, Sr, Ti, V, Zr, Mn, Fe, Co, Cu, Zn, Cr, Mg, Nb, Mo and Cd);

$$LiM^3{}_eMn_{1-e}O_2 \qquad \text{[Formula 3]}$$

(wherein e is 0≤e<0.5, and M³ is at least one element selected from the group consisting of Cr, Al, Ni, Mn and Co);

$$Li_2M^4O_2 \qquad \text{[Formula 4]}$$

(wherein M⁴ is at least one element selected from the group consisting of Cu and Ni);

$$Li_{3+f}Nb_{1-g}M^5{}_gS_{4-h} \qquad \text{[Formula 5]}$$

(wherein −0.1≤f≤1, 0≤g≤0.5, and −0.1≤h≤0.5, and M⁵ is at least one element selected from the group consisting of Mn, Fe, Co, Cu, Zn, Mg and Cd);

$$LiM^6{}_iMn_{1-i}O_2 \qquad \text{[Formula 6]}$$

(wherein i is 0.05≤i<0.5, and M⁶ is at least one group consisting of Cr, Al, Ni, Mn, and Co);

$$LiM^7{}_{2j}Mn_{2-2j}O_4 \qquad \text{[Formula 7]}$$

(wherein j is 0.05≤j<0.5, and M⁷ is at least one element selected from the group consisting of Cr, Al, Ni, Mn, and Co);

$$Li_k\text{-}M^8{}_m\text{—}N_n \qquad \text{[Formula 8]}$$

(wherein M⁸ is an alkaline earth metal, k/(k+m+n) is 0.10 to 0.40, m/(k+m+n) is 0.20 to 0.50, n/(k+m+n) is 0.20 to 0.50).

The lithium metal compounds of Formulas 1 to 8 have different irreversible capacities depending on the structure, and they can be used alone or in combination and serve to increase the irreversible capacity of the positive electrode active material.

For example, the high irreversible materials represented by Formulas 1 and 3 have different irreversible capacities depending on their types, and for example, the values shown in Table 1 below.

TABLE 1

|  | Initial charging capacity (mAh/g) | Initial discharging capacity (mAh/g) | Initial Coulomb efficiency | Ratio of initial irreversible capacity |
|---|---|---|---|---|
| [Formula 1] Li₂NiO₂ | 370 | 110 | 29.7% | 70.3% |
| [Formula 3] LiMnO₂ | 230 | 100 | 43.5% | 56.5% |
| [Formula 3] LiCrₓMn₁₋ₓO₂ | 230 | 80 | 34.8% | 65.2% |

In addition, the lithium metal compounds of Formula 2 belonging to space group Immm are preferred, and among them, it is more preferable that Ni, M composite oxide form a planar four-coordinate (Ni, M)O4, and the planar four-coordinate structure shares the opposite side (side formed by O—O) and forms a primary chain. it is preferable that the crystal lattice constants of the compound of Formula 2 are a=3.7±0.5 Å, b=2.8±0.5 Å, c=9.2±0.5 Å, α=90°, β=90°, and γ=90°.

In addition, the lithium metal compound of Formula 8 has an alkaline earth metal content of 30 to 45% by atom and a nitrogen content of 30 to 45% by atom. At this time, when the content of the alkaline earth metal and the content of nitrogen are within the above range, the thermal characteristics and lithium ion conduction characteristics of the compound of Formula 1 are excellent. Additionally, in Formula 8, k/(k+m+n) is 0.15 to 0.35, for example, 0.2 to 0.33, m/(k+m+n) is 0.30 to 0.45, and n/(k+m+n) is 0.30 to 0.45, for example, 0.31 to 0.33.

According to one embodiment, the electrode active material of the Formula 1 has a in the range of 0.5 to 1, b of 1, and c of 1.

The positive electrode active material may be a core-shell structure having a surface coated with a compound of any one of Formulas 1 to 8 above.

When a coating layer composed of any one of the above chemical formulas 1 to 8 is formed on the surface of the core active material, the electrode active material exhibits stable characteristics while maintaining a low resistance characteristic even in an environment in which lithium ions are continuously inserted and desorbed.

The thickness of the coating layer in the electrode active material according to an embodiment of the present invention is 1 to 100 nm. When the thickness of the coating layer is in the above range, the ion conductive characteristics of the electrode active material is excellent.

The average particle diameter of the electrode active material is 1 to 30 μm, and in one embodiment, 8 to 12 μm. When the average particle diameter of the positive electrode active material is in the above range, the capacity characteristics of the battery are excellent.

The alkaline earth metal-doped core active material may be, for example, $LiCoO_2$ doped with magnesium. The content of magnesium is 0.01 to 3 parts by weight based on 100 parts by weight of the core active material.

The lithium transition metal oxide is used as positive electrode active material in a positive electrode mixture 13 together with a binder and a conductive material. In the anode-free battery structure of the present invention, the lithium source for forming the lithium metal layer 23 is the lithium transition metal oxide. That is, the lithium ions in the lithium transition metal oxide are desorbed to form a lithium metal layer 23 on the negative electrode current collector 21, when performing charging in a certain range of voltage range.

For example, in the present invention, the charging for forming the lithium metal layer 23 is performed once at 0.01 to 0.2 C in the voltage range of 4.5V to 2.5V. If the charging is performed below the above range, the formation of the lithium metal layer 23 becomes difficult. On the contrary, if the charging is performed above the range, over-discharging due to damage of the battery occurs and then the charging/discharging does not proceed properly.

The lithium metal layer 23 formed above forms a uniform continuous or discontinuous layer on the negative electrode current collector 21. For example, if the negative electrode current collector 21 is in the form of a foil, it can have a form of the continuous thin film, and if the negative electrode current collector 21 has a three-dimensional porous structure, the lithium metal layer 23 may be discontinuously formed. That is, a discontinuous layer means that the region where the lithium metal layer 23 exists is distributed without continuity, because the region where the lithium metal layer 23 exists and the region where the lithium metal layer 23 does not exist are present in a discontinuous distribution in the specific region and also the region where the lithium metal layer 23 exists is distributed so as to interrupt, isolate or separate, like an island type, the region where the lithium compound exists by the region where the lithium metal layer 23 does not exist.

The lithium metal layer 23 formed through such charging/discharging has a thickness of 50 nm or more and 100 μm or less, preferably 1 μm to 50 μm, for the function as a negative electrode. If the thickness is less than the above range, the charging/discharging efficiency is drastically reduced. On the contrary, if the thickness exceeds the above range, life characteristics and the like are stable, but there is a problem that the energy density of the battery is lowered.

Particularly, the battery is manufactured as an anode-free battery without lithium metal at the time of assembling. Accordingly, an oxide layer generated during the assembly process due to the high reactivity of lithium is not formed or hardly formed on the lithium metal layer 23, in comparison with lithium secondary battery assembled using conventional lithium foil. Thus, a degradation phenomenon of the service life of the battery due to the oxidation layer can be prevented.

Also, the lithium metal layer 23 is moved by charging the high-irreversible material, and it can form a more stable lithium metal layer 23 in comparison with the lithium metal layer 23 formed on the positive electrode. When the lithium metal is attached on the positive electrode, a chemical reaction between the positive electrode and the lithium metal may occur.

The positive electrode mixture 13 comprising the positive electrode active material and the lithium metal compound is constituted, and at this time, the positive electrode mixture 13 may further comprise conductive materials, binders, and other additives commonly used in lithium secondary batteries.

The conductive material is used to further improve the electrical conductivity of the electrode active material. Such conductive material is not particularly limited as long as it has electrical conductivity without causing a chemical change in the battery, and for example may be graphite such as natural graphite and artificial graphite; carbon blacks such as carbon black, acetylene black, Ketjen black, channel black, furnace black, lamp black, and summer black, etc.; electrically conductive fibers such as carbon fiber and metal fiber, etc.; metal powders such as carbon fluorine, aluminum, and nickel powder, etc.; electrically conductive whiskers such as zinc oxide and potassium titanate, etc.; an electrically conductive metal oxides such as titanium oxide, etc.; or polyphenylene derivatives, etc.

A binder may further be included for the binding of the positive electrode active material, the lithium metal compound and the conductive material and for the binding to the current collector. The binder may comprise a thermoplastic resin or a thermosetting resin. For example, polyethylene, polypropylene, polytetrafluoroethylene (PTFE), polyvinylidene fluoride (PVDF), styrene-butadiene rubber, tetrafluoroethylene-perfluoroalkylvinylether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, or ethylene-acrylic acid copolymers, etc. may be used alone or in combination, but are not necessarily limited thereto, and any binders are possible as long as they can be used as binders in the art.

Examples of other additives include fillers. The filler is optionally used as a component for suppressing the expansion of the electrode and is not particularly limited as long as it is a fibrous material without causing a chemical change in the battery. For example, fibrous materials such as an olefinic polymer such as polyethylene or polypropylene, or glass fiber or carbon fiber, etc. are used.

A positive electrode mixture 13 of the present invention is formed on a positive electrode current collector 11.

The positive electrode current collector generally is formed in the thickness of 3 to 500 µm. The positive electrode current collector 11 is not particularly limited as long as it has high conductivity without causing chemical change in the battery, the examples thereof may be stainless steel, aluminum, nickel, titanium, sintered carbon, or aluminum or stainless steel surface-treated with carbon, nickel, titanium or silver. At this time, the positive electrode current collector 11 may be used in various forms such as film, sheet, foil, net, porous substance, foam or nonwoven fabric having fine irregularities formed on its surface so as to increase the adhesive force with the positive electrode active material.

The method of applying the positive electrode mixture 13 on the current collector may comprise a method in which a slurry of an electrode mixture is distributed onto a current collector and then uniformly dispersed using a doctor blade or the like, and methods such as die casting, comma coating, screen printing, etc. In addition, the slurry of the electrode mixture may be formed on a separate substrate, and then the slurry of the electrode mixture may be bonded to the current collector by a pressing or lamination method but is not limited thereto.

Meanwhile, in the lithium secondary battery according to the second embodiment of the present invention, a protective layer 55 may be additionally formed on the surface of the negative electrode in contact with the separator 60. Specifically, when forming the protective layer 55, the lithium metal layer 53 is formed on the negative electrode current collector 51 by the lithium ions that are transferred from the positive electrode mixture 43 and passed through the protective layer 55, as shown in FIG. 4.

Accordingly, the protective layer 55 may be any material capable of smoothly transferring lithium ions therethrough, the lithium ion conductive polymer and/or any material used for the inorganic solid electrolyte may be used as the protective layer, and the protective layer may further comprise a lithium salt if necessary The lithium ion conductive polymer may comprise, for example, but is not limited to, any one selected from the group consisting of polyethylene oxide (PEO), polyacrylonitrile (PAN), polymethylmethacrylate (PMMA), polyvinylidene fluoride (PVDF), polyvinylidene fluoride-hexafluoropropylene (PVDF-HFP), LiPON, $Li_3N$, $LixLa_{1-x}TiO_3$ (0<x<1) and $Li_2S$—GeS—$Ga_2S_3$ or a mixture of two or more thereof. The lithium ion conductive polymer can be used without restriction if it has conductivity for lithium ion.

The formation of the protective layer 55 using a lithium ion conductive polymer is performed by dissolving or swelling the lithium ion conductive polymer in a solvent to prepare a coating solution and coating it on the negative electrode current collector 51.

The coating method may be selected from known methods in consideration of the characteristics of the material or may be performed by any new appropriate method. For example, it is preferable that the polymer protective layer composition is distributed onto the current collector, and then uniformly dispersed using a doctor blade or the like. In some cases, a method of executing the distribution and dispersion processes in one process may be used. In addition, the protective layer may be formed by methods such as dip coating, gravure coating, slit die coating, spin coating, comma coating, bar coating, reverse roll coating, screen coating, cap coating, etc. At this time, the negative electrode current collector 51 is the same as described above.

Thereafter, a drying process may be performed on the protective layer 55 formed on the negative electrode current collector 51, and at this time, the drying process may be performed by a method such as heating or hot air drying, etc. at a temperature of 80 to 120° C. depending on the type of the solvent used in the lithium ion conductive polymer.

In this case, the solvent to be used is preferably a solvent having a similar solubility index to the lithium ion conductive polymer and a low boiling point. This is because the mixing can be made uniform and then the solvent can be easily removed. Specifically, the solvent may be N,N'-dimethylacetamide (DMAc), dimethyl sulfoxide (DMSO), N,N-dimethylformamide (DMF), acetone, tetrahydrofuran, methylene chloride, chloroform, dimethylformamide, N-methyl-2-pyrrolidone (NMP), cyclohexane, water or a mixture thereof.

When the lithium ion conductive polymer is used, in order to further increase lithium ion conductivity, a substance used for this purpose is further included.

For example, lithium salts such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic carboxylic acid lithium, 4-phenylboric acid lithium, lithium imide and the like may be further included.

The inorganic solid electrolyte may be a crystalline or amorphous material of a ceramic-based material, and may be an inorganic solid electrolyte such as Thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ (w is w<1), $Li_{3.6}Si_{0.6}P_{0.4}O_4$ and the like. In this case, when inorganic solid electrolytes are used, lithium salts may be further included if necessary.

The inorganic solid electrolyte may be mixed with known materials such as a binder and applied in a thick film form through slurry coating. Further, if necessary, it is possible to apply in the form of a thin film through a deposition process such as sputtering. The slurry coating method used can be appropriately selected based on the coating method, the drying method and the solvent as mentioned in connection with the lithium ion conductive polymer.

The protective layer 55 comprising the lithium ion conductive polymer and/or the inorganic solid electrolyte described above can simultaneously ensure the effect of inhibiting or preventing the formation of the lithium dendrite, which is generated when the lithium metal layer 53/the negative electrode current collector 51 are used as the negative electrode, while increasing the transfer rate of lithium ions and then facilitating the formation of the lithium metal layer 53.

In order to ensure the above effect, it is necessary to limit the thickness of the protective layer 55.

The lower the thickness of the protective layer 55, the better the output characteristics of the battery. However, only when the protective layer is formed over a certain thickness, the side reaction between the lithium and the electrolyte formed on the negative electrode current collector 51 can be suppressed subsequently and further the growth of the dendrite can be effectively blocked. In the present invention, the thickness of the protective layer 55 may be preferably 10 nm to 50 µm. If the thickness of the protective layer 55 is less than the above range, the overcharging or the side reaction and the exothermic reaction between the lithium and the electrolyte which are increased under the conditions such as high temperature storage cannot be effectively suppressed and thus the safety cannot be improved. Also, if the thickness exceeds the above range, the composition of the protective layer 55 in the case of the lithium ion conductive polymer is required to be impregnated or swelled for a long time by the electrolytic solution and there is a concern that the movement of the lithium ions is lowered and the performance of the whole battery is deteriorated.

For the lithium secondary battery of the second embodiment of the present invention, the rests of the configuration except for the protective layer 55 are the same as those mentioned in the first embodiment.

Meanwhile, as shown in the structures of FIGS. 3 and 6, the lithium secondary battery may comprise the positive electrode 40, the negative electrode 50 and the separators 30 and 60 and the electrolyte (not shown) interposed therebetween, and the separators 30 and 60 may be excluded depending on the type of the battery.

In this case, the separators 30 and 60 may be made of a porous substrate. The porous substrate may be any porous substrate commonly used in an electrochemical device. For example, a polyolefin-based porous film or a nonwoven fabric may be used, but not particularly limited thereto.

The separators 30 and 60 according to the present invention are not particularly limited in their materials and any separators can be used without any particular limitation as long as they are separators commonly used as the separators 30 and 60 in the lithium secondary battery, while physically separating the positive electrode and the negative electrode from each other and having a permeability to electrolyte and ions. However, materials that are porous, nonconductive, or insulative, especially those that have low resistance to migration of ions in the electrolyte solution and have good wetting ability for the electrolyte solution are desirable. For example, a polyolefin-based porous membrane or nonwoven fabric may be used, but it is not particularly limited thereto.

Examples of the polyolefin-based porous membrane may be a membrane formed of any polymer alone selected from polyethylenes such as high density polyethylene, linear low density polyethylene, low density polyethylene and ultra high molecular weight polyethylene, and polyolefin-based polymers such as polypropylene, polybutylene and polypentene or formed of a polymer mixture thereof.

In addition to the above-mentioned polyolefin-based nonwoven fabric, the nonwoven fabric may be a nonwoven fabric formed of, for example, any polymer alone selected from polyphenylene oxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester, and the like, or formed of a polymer mixture thereof. Such nonwoven fabrics comprise a nonwoven fabric in the form of a fiber to form a porous web, that is, a spunbond or a meltblown nonwoven fabric composed of long fibers.

The thicknesses of the separators 30 and 60 are not particularly limited, but are preferably in the range of 1 to 100 μm, more preferably 5 to 50 μm. When the thicknesses of the separators 30 and 60 is less than 1 μm, the mechanical properties cannot be maintained. When the thicknesses of the separators exceeds 100 μm, the separators act as a resistive layer, thereby deteriorating the performance of the battery.

The pore sizes and porosities of the separators 30 and 60 are not particularly limited, but they are preferable that the pore sizes are 0.1 to 50 μm and the porosities are 10 to 95%. If the separators 30 and 60 have the pore sizes of less than 0.1 μm or the porosities of less than 10%, the separators 30 and 60 act as resistive layers. If the separators have the pore sizes of more than 50 μm or the porosities of more than 95%, mechanical properties cannot be maintained.

The electrolyte of the lithium secondary battery is a lithium salt-containing electrolyte solution which is a non-aqueous electrolyte consisting of a non-aqueous organic solvent electrolyte solution and a lithium salt, and also may comprise an organic solid electrolyte or an inorganic solid electrolyte but is not limited thereto.

The non-aqueous organic solvent may be aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyltetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, triester phosphate, trimethoxymethane, dioxolane derivatives, sulfolane, methylsulfolane, 1,3-dimethyl-2-imidazolidinone, propylene carbonate derivatives, tetrahydrofuran derivatives, ethers, methyl propionate, ethyl propionate and the like.

The electrolyte salt contained in the non-aqueous electrolyte solution is a lithium salt. The lithium salt can be used without limitation as long as it is commonly used in an electrolyte solution for a lithium secondary battery. For example, the anion of the lithium salt may comprise any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ 및 $(CF_3CF_2SO_2)_2N^-$ or a combination of two or more of these anions.

The organic solvent contained in the non-aqueous electrolyte solution can be used without limitation as long as it is commonly used in an electrolyte for a lithium secondary battery, and for example, ether, ester, amide, linear carbonate, cyclic carbonate and the like may be used alone or in combination of two or more thereof. Among them, carbonate compounds which are typically cyclic carbonate, linear carbonate, or a mixture thereof may be included.

Specific example of the cyclic carbonate compound comprises any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and their halide, or a mixture of two or more thereof. Example of such halides comprises, but is not limited to, fluoroethylene carbonate (FEC) and the like Also, specific example of the linear carbonate compound may typically comprise, but are not limited to, any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more thereof.

Particularly, cyclic carbonates such as ethylene carbonate and propylene carbonate among the carbonate-based organic solvents are highly viscous organic solvents and have a high dielectric constant, and thus can dissociate lithium salts in the electrolyte much better. When these cyclic carbonates are mixed with linear carbonates with a low viscosity and a low dielectric constant, such as dimethyl carbonate and diethyl carbonate, at a suitable ratio, an electrolyte solution having the higher electrical conductivity can be prepared.

In addition, the ether among the above organic solvents may be, but is not limited to, any one selected from the group consisting of dimethyl ether, diethyl ether, dipropyl ether, methylethyl ether, methylpropyl ether and ethylpropyl ether, or a mixture of two or more thereof.

In addition, the ester among the above organic solvents may be, but is not limited to, any one selected from the group consisting of methyl acetate, ethyl acetate, propyl acetate, methyl propionate, ethyl propionate, propyl propionate, γ-butyrolactone, γ-valerolactone, γ-caprolactone, α-valerolactone and ε-caprolactone, or a mixture of two or more thereof.

The injection of the non-aqueous electrolyte solution can be performed at an appropriate stage during the manufacturing process of the electrochemical device, depending on the manufacturing process and required physical properties of the final product. That is, such injection can be carried out before assembling the electrochemical device or in the final stage of assembling the electrochemical device.

The organic solid electrolyte may be, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, polymer containing an ionic dissociation group and the like.

The inorganic solid electrolyte may be, for example, nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Also, in order to improve the characteristics of charging/discharging, flame retardancy, etc., for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidine, ethylene glycol dialkyl ether, ammonium salt, pyrrole, 2-methoxyethanol, aluminum trichloride, etc. may be added to the non-aqueous electrolyte. In some cases, halogen-containing solvents such as carbon tetrachloride and ethylene trifluoride may be further added in order to impart nonflammability, and carbon dioxide gas may be further included in order to improve the high-temperature conservation characteristics.

The type of lithium secondary battery as described above is not particularly limited, and may be, for example, a jelly-roll type, a stack type, a stack-folding type (comprising a stack-Z-folding type), or a lamination-stack type, preferably a stack-folding type.

The electrode assembly in which the positive electrode, the separator, and the negative electrode are sequentially stacked is prepared, and the electrode assembly is inserted into the battery case, and then the electrolyte solution is injected into the upper part of the case and sealed with cap plate and gasket to assemble the lithium secondary battery.

In this case, the lithium secondary battery can be classified into various types of batteries such as lithium-sulfur battery, lithium-air battery, lithium-oxide battery, and lithium all-solid-state battery depending on the type of positive electrode material and separator used, can be classified into cylindrical, rectangular, coin-shaped, pouch type depending on the type, and can be divided into bulk type and thin film type depending on the size. The structure and manufacturing method of these batteries are well known in the art, and thus detailed description thereof is omitted.

The lithium secondary battery according to the present invention can be used as a power source for devices requiring high capacity and high rate characteristics, etc. Specific examples of the device may include, but are not limited to, a power tool that is powered by a battery powered motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system, Hereinafter, it will be apparent to those skilled in the art that although the preferred embodiments are shown to facilitate understanding of the present invention, the following examples illustrate only the present invention and various changes and modifications may be made within the scope and spirit of the present invention. It is also natural that such variations and modifications are within the scope of the appended claims.

EXAMPLES

Example 1: Manufacture of Anode Free Battery (1) Manufacture of Positive Electrode To 30 ml of N-methyl-2-pyrrolidone, a mixture of LCO ($LiCoO_2$), the super-P and the binder (PVdF) mixed at a weight ratio of 95:2.5:2.5 of LCO($LiCoO_2$):the super-P:the binder (PVdF) was added, and then 30 wt. % of LMO ($LiMnO_2$) relative to LCO was added, and then mixed using a paste face mixer for 30 minutes to prepare a slurry composition. At this time, the weight of the added LCO was 15 g.

Subsequently, the slurry composition prepared above was coated on a current collector (Al Foil, thickness 20 μm) and dried at 130° C. for 12 hours to manufacture respective positive electrode.

(2) Preparation of Gel Polymer Electrolyte

LiFSI was dissolved to 100 ml of a dimethoxyethane solvent for a non-aqueous electrolyte solution to be a concentration of 4M and thus prepared an electrolyte solution. PVDF and ETPTA polymers were added in a weight ratio of 3:2 of the sum of PVDF and ETPTA polymers relative to the weight of the electrolyte solution and in a weight ratio of 2:8 of PVDF polymer and ETPTA polymer, and benzoyl peroxide as a polymerization initiator was added in an amount of 0.7% by weight based on the total weight of the composition for the electrolyte. Thus, a composition for a gel polymer electrolyte was prepared.

Then, a gel polymer electrolyte was prepared by gelling at 65° C.

(3) Manufacture of Anode Free Battery

An electrode assembly was manufactured by interposing the separator and the gel polymer electrolyte of item (2) above between the positive electrode manufactured in item (1) above and the negative electrode current collector, and the electrode assembly was placed inside the case and then manufactured a lithium secondary battery.

Example 2: Manufacture of Anode Free Battery (1) Manufacture of Positive Electrode To 30 ml of N-methyl-2-pyrrolidone, a mixture of LCO ($LiCoO_2$), the super-P and the binder (PVdF) mixed at a weight ratio of 95:2.5:2.5 of LCO($LiCoO_2$):the super-P:the binder (PVdF) was added, and then 30 wt. % of LMO ($LiMnO_2$) relative to LCO was added, and then mixed using a paste face mixer for 30 minutes to prepare a slurry composition. At this time, the weight of the added LCO was 15 g.

Subsequently, the slurry composition prepared above was coated on a current collector (Al Foil, thickness 20 μm) and dried at 130° C. for 12 hours to manufacture respective positive electrode.

(2) Preparation of Crosslinked Gel Polymer Electrolyte

LiFSI was dissolved to 100 ml of a DMC solvent for a non-aqueous electrolyte solution to be a concentration of 3M and thus prepared an electrolyte solution. PVDF and ETPTA polymers were added in a weight ratio of 3:2 of the sum of PVDF and ETPTA polymers relative to the weight of the electrolyte solution and in a weight ratio of 2:8 of PVDF polymer and ETPTA polymer, and benzoyl peroxide as a polymerization initiator was added in an amount of 0.7% by weight based on the total weight of the composition for the electrolyte. Thus, a composition for a gel polymer electrolyte was prepared.

Then, a gel polymer electrolyte was prepared by gelling at 80° C.

(3) Manufacture of Anode Free Battery

An electrode assembly was manufactured by interposing the separator and the gel polymer electrolyte of item (2) above between the positive electrode manufactured in item (1) above and the negative electrode current collector, and the electrode assembly was placed inside the case and then manufactured a lithium secondary battery.

Example 3: Manufacture of Anode Free Battery (1) Manufacture of Positive Electrode To 30 ml of N-methyl-2-pyrrolidone, a mixture of LFP (LiFePO$_4$), the super-P and the binder (PVdF) mixed at a weight ratio of 95:2.5:2.5 of LFP(LiFePO$_4$):the super-P:the binder (PVdF) was added, and then 30 wt. % of LMO (LiMnO$_2$) relative to LFP was added, and then mixed using a paste face mixer for 30 minutes to prepare a slurry composition. At this time, the weight of the added LFP was 15 g.

Subsequently, the slurry composition prepared above was coated on a current collector (Al Foil, thickness 20 μm) and dried at 130° C. for 12 hours to manufacture respective positive electrode.

(2) Preparation of Crosslinked Gel Polymer Electrolyte

LiFSI was dissolved to 100 ml of a dimethoxyethane solvent for a non-aqueous electrolyte solution to be a concentration of 4M and thus prepared an electrolyte solution. PVDF and ETPTA polymers were added in a weight ratio of 3:2 of the sum of PVDF and ETPTA polymers relative to the weight of the electrolyte solution and in a weight ratio of 2:8 of PVDF polymer and ETPTA polymer, and benzoyl peroxide as a polymerization initiator was added in an amount of 0.7% by weight based on the total weight of the composition for the electrolyte. Thus, a composition for a gel polymer electrolyte was prepared.

Then, a gel polymer electrolyte was prepared by gelling at 65° C.

(3) Manufacture of Anode Free Battery

An electrode assembly was manufactured by interposing the separator and the gel polymer electrolyte of item (2) above between the positive electrode manufactured in item (1) above and the negative electrode current collector, and the electrode assembly was placed inside the case and then manufactured a lithium secondary battery.

Example 4: Manufacture of Anode Free Battery with PEO Protective Layer (1) Manufacture of Positive Electrode To 30 ml of N-methyl-2-pyrrolidone, a mixture of LCO (LiCoO$_2$), the super-P and the binder (PVdF) mixed at a weight ratio of 95:2.5:2.5 of LCO(LiCoO$_2$):the super-P:the binder (PVdF) was added, and then 30 wt. % of LMO (LiMnO$_2$) relative to LCO was added, and then mixed using a paste face mixer for 30 minutes to prepare a slurry composition. At this time, the weight of the added LCO was 15 g.

Subsequently, the slurry composition prepared above was coated on a current collector (Al Foil, thickness 20 μm) and dried at 130° C. for 12 hours to manufacture respective positive electrode.

(2) Manufacture of Negative Electrode Current Collector with Protective Layer

A solution for forming a protective layer was prepared by adding 8 g of polyethylene oxide (MV: 4,000,000) and lithium bis(trifluoromethanesulfonyl) imide (LiTFSI, ((CF$_3$SO$_2$)$_2$NLi) at a ratio of EO:Li=9:1 (repeating unit of EO:PEO) to 50 ml of an acetonitrile solvent and mixing them.

The solution for forming the protective layer was coated on a copper current collector and then dried at 80° C. for 6 hours to form a protective layer (thickness: 10 μm) on the copper current collector.

(3) Preparation of Gel Polymer Electrolyte

LiFSI was dissolved to 100 ml of a dimethoxyethane solvent for a non-aqueous electrolyte solution to be a concentration of 4M and thus prepared an electrolyte solution. PVDF and ETPTA polymers were added in a weight ratio of 3:2 of the sum of PVDF and ETPTA polymers relative to the weight of the electrolyte solution and in a weight ratio of 2:8 of PVDF polymer and ETPTA polymer, and benzoyl peroxide as a polymerization initiator was added in an amount of 0.7% by weight based on the total weight of the composition for the electrolyte. Thus, a composition for a gel polymer electrolyte was prepared.

Then, a gel polymer electrolyte was prepared by gelling at 65° C.

(4) Manufacture of Anode Free Battery

An electrode assembly was manufactured by interposing the separator and the gel polymer electrolyte of item (3) above between the positive electrode manufactured in item (1) above and the negative electrode current collector, and the electrode assembly was placed inside the case and then manufactured a lithium secondary battery.

Example 5: Manufacture of Anode Free Battery with LiPON Protective Layer (1) Manufacture of Positive Electrode To 30 ml of N-methyl-2-pyrrolidone, a mixture of LCO (LiCoO$_2$), the super-P and the binder (PVdF) mixed at a weight ratio of 95:2.5:2.5 of LCO(LiCoO$_2$):the super-P:the binder (PVdF) was added, and then 30 wt. % of LMO (LiMnO$_2$) relative to LCO was added, and then mixed using a paste face mixer for 30 minutes to prepare a slurry composition. At this time, the weight of the added LCO was 15 g.

Subsequently, the slurry composition prepared above was coated on a current collector (Al Foil, thickness 20 μm) and dried at 130° C. for 12 hours to manufacture respective positive electrode.

(2) Manufacture of Negative Electrode Current Collector with LiPON Protective Layer For the LiPON protective layer, a coating layer was formed by sputtering for 25 minutes using a $Li_3PO_4$ target in a vacuum chamber under $N_2$ atmosphere. It was confirmed that the thickness of the surface coating layer was controlled according to the deposition time, and the protective layer (thickness: 0.2 μm) was formed on the copper current collector. The thickness of the coating layer formed on the surface of the coating layer was confirmed using a scanning electron microscope (JSM-7610F, JEOL).

(3) Preparation of Gel Polymer Electrolyte

LiFSI was dissolved to 100 ml of a dimethoxyethane solvent for a non-aqueous electrolyte solution to be a concentration of 4M and thus prepared an electrolyte solution. PVDF and ETPTA polymers were added in a weight ratio of 3:2 of the sum of PVDF and ETPTA polymers relative to the weight of the electrolyte solution and in a weight ratio of 2:8 of PVDF polymer and ETPTA polymer, and benzoyl peroxide as a polymerization initiator was added in an amount of 0.7% by weight based on the total weight of the composition for the electrolyte. Thus, a composition for a gel polymer electrolyte was prepared.

Then, a gel polymer electrolyte was prepared by gelling at 65° C.

(4) Manufacture of Anode Free Battery

An electrode assembly was manufactured by interposing the separator and the gel polymer electrolyte of item (3) above between the positive electrode manufactured in item (1) above and the negative electrode current collector, and the electrode assembly was placed inside the case and then manufactured a lithium secondary battery.

Comparative Example 1: Manufacture of Lithium Secondary Battery

(1) Manufacture of Positive Electrode

To 30 ml of N-methyl-2-pyrrolidone, a mixture of LCO ($LiCoO_2$), the super-P and the binder (PVdF) mixed at a weight ratio of 95:2.5:2.5 of LCO($LiCoO_2$):the super-P:the binder (PVdF) was added, and then 30 wt. % of LMO ($LiMnO_2$) relative to LCO was added, and then mixed using a paste face mixer for 30 minutes to prepare a slurry composition. At this time, the weight of the LCO added was 15 g.

Subsequently, the slurry composition prepared above was coated on a current collector (Al Foil, thickness 20 μm) and dried at 130° C. for 12 hours to manufacture respective positive electrode.

(2) Manufacture of Negative Electrode

Lithium foil (thickness 20 μm) was laminated on the copper collector to prepare a negative electrode.

(3) Manufacture of Lithium Secondary Battery

An electrode assembly was manufactured by interposing a porous polyethylene separator between the positive electrode manufactured in item (1) above and the negative electrode, and the electrode assembly was placed inside the case and then the electrolyte was injected to manufacture a lithium secondary battery. In this case, the electrolyte was prepared by dissolving 1 M $LiPF_6$ in an organic solvent having a volume ratio of 3:7 of EC (ethylene carbonate): EMC (ethylmethyl carbonate).

Comparative Example 2: Manufacture of Anode Free Battery

(1) Manufacture of Positive Electrode

To 30 ml of N-methyl-2-pyrrolidone, a mixture of LFP ($LiFePO_4$), the super-P and the binder (PVdF) mixed at a weight ratio of 95:2.5:2.5 of LCO($LiCoO_2$):the super-P:the binder (PVdF) was added, and then mixed using a paste face mixer for 30 minutes to prepare a slurry composition. At this time, the weight of the LFP added was 15 g.

Subsequently, the slurry composition prepared above was coated on a current collector (Al Foil, thickness 20 μm) and dried at 130° C. for 12 hours to manufacture respective positive electrode.

(2) Manufacture of Negative Electrode

Lithium foil (thickness 20 μm) was laminated on the copper collector to prepare a negative electrode.

(3) Manufacture of Lithium Secondary Battery

An electrode assembly was manufactured by interposing a porous polyethylene separator between the positive electrode manufactured in item (1) above and the negative electrode, and the electrode assembly was placed inside the case and then the electrolyte was injected to manufacture a lithium secondary battery. In this case, the electrolyte was prepared by dissolving 1 M $LiPF_6$ in fluoroethylene carbonate (FEC).

Experimental Example 1: Analysis of Characteristics of Lithium Secondary Battery The anode-free batteries prepared in Examples and Comparative Examples were charged/discharged under the conditions of charging 0.2 C, 4.25V CC/CV (5% current cut at 1 C) and discharging 0.1 C CC 3V to manufacture the lithium secondary batteries having the lithium metal layer. Subsequently, the resistance change rate after initial lithium formation was measured and is shown in Table 2 below.

The resistance was measured under the following conditions.

Equipment: BIOLOGICS (potentiostat)
Voltage: 10 mV AC
Frequency: 1 MHz to 10 mHz
Initial resistance: Measurement of the resistance at a frequency of 10 Hz after 1 cycle charging/discharging after 1 day of battery manufacturing
Resistance after 1 month: Measurement of the resistance at frequency of 10 Hz after 31 days of battery manufacturing
Resistance increase rate: (resistance after one month–initial resistance)/initial resistance*100

TABLE 2

|  | Amount of Li formation at 1 Cyc. (mAh/cm2) | Resistance increase rate after one month compared to initial resistance |
| --- | --- | --- |
| Example 1 | 1.63 | 23% |
| Example 2 | 1.64 | 52% |
| Example 3 | 1.64 | 21% |
| Example 4 | 1.62 | 38% |
| Example 5 | 1.59 | 8% |
| Comp. Example 1 | 1.63 | 114% |
| Comp. Example 2 | 1.63 | 75% |

As shown in Table 2, when the reduction potential of the electrolyte was unstable as in Comparative Examples 1 and 2, it was found that as aging progresses, the resistance is increased due to the reduction of the electrolyte at the interface with Li. For Examples 1 to 5 of the present invention, it was found that the electrolyte solution was gelled, thereby inhibiting such reactivity.

DESCRIPTION OF SYMBOLS 10, 40: Positive electrode
11, 41: Positive electrode current collector
13, 43: Positive electrode mixture
20, 50: Negative electrode
21, 51: Negative electrode current collector
23, 53: lithium metal layer
30, 60: Separator
55: Protective layer

The invention claimed is:

1. A lithium secondary battery comprising a positive electrode, a negative electrode, and a separator and an electrolyte interposed therebetween,
wherein the electrolyte is a gel polymer electrolyte,
wherein the gel polymer electrolyte has a crosslinked structure,
wherein the gel polymer electrolyte comprises a polymer matrix, a lithium salt an organic solvent, and a polymerization initiator comprising a peroxide, and
wherein lithium metal is formed on a negative electrode current collector in the negative electrode by moving from the positive electrode by charging.

2. The lithium secondary battery of claim 1, wherein the lithium metal is formed through one-time charge in a voltage range of 4.5V to 2.5V.

3. The lithium secondary battery of claim 1, wherein the polymer matrix is a matrix obtained by polymerizing a monomer having at least two functional groups selected from the group consisting of a carboxylic group, an acrylate group and a cyano group in a molecular structure.

4. The lithium secondary battery of claim 1, wherein the lithium salt is LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, LiSCN, LiC(CF$_3$SO$_2$)$_3$, (CF$_3$SO$_2$)$_2$NLi, (FSO$_2$)$_2$NLi, lithium chloroborane, lithium lower aliphatic carboxylate, lithium 4-phenyl borate, or lithium imide.

5. The lithium secondary battery of claim 1, wherein the negative electrode further comprises a protective layer formed on a surface in contact with the separator.

6. The lithium secondary battery of claim 1, wherein the positive electrode comprises at least one electrode active material selected from the group consisting of
LiCoO$_2$,
LiNiO$_2$,
LiMnO$_2$,
LiMn$_2$O$_4$
Li(Ni$_a$Co$_b$Mn$_c$)O$_2$ wherein 0<a<1, 0<b<1, 0<c<1, a+b+c=1,
LiNi$_{1-y}$Co$_y$O$_2$, LiCo$_{1-y}$Mn$_y$O$_2$, LiNi$_{1-y}$MnYO$_2$ wherein 0≤Y<1, Li(Ni$_a$Co$_b$Mn$_c$) wherein 0<a<2, 0<b<2, 0<c<2, a+b+c=2,
LiMn$_{2-z}$Ni$_z$O4, LiMn$_{2-z}$Co$_z$O$_4$ wherein, 0<Z<2,
Li$_x$M$_y$Mn$_{2-y}$O$_{4-z}$A$_z$, wherein 0.9≤x≤1.2, 0<y<2, and M=at least one of Al, Mg, Ni, Co, Fe, Cr, V, Ti, Cu, B, Ca, Zn, Zr, Nb, Mo, Sr, Sb, W, Ti and Bi, and A is at least one −1 valent or −2 valent anion, Li$_{1+a}$NibM'$_{1-b}$O$_{2-c}$A'$_c$ wherein 0≤a≤0.1, 0≤b≤0.8, 0≤c≤0.2, M' is at least one selected from the group consisting of stable 6-coordination elements, and A' is at least one −1 valent or −2 valent anion,
LiCoPO$_4$, and
LiFePO$_4$.

7. The lithium secondary battery of claim 1, wherein the positive electrode comprises a lithium metal compound represented by any one of the following $$Li_2Ni_{1-a}M^1_aO_2 \quad \text{[Formula 1]}$$

(wherein 0≤a<1, and M' is at least one element of Mn, Fe, Co, Cu, Zn, Mg and Cd);

$$Li_{2+b}Ni_{1-c}M^2_cO_{2+d} \quad \text{[Formula 2]}$$

(wherein −0.5≤b<0.5, 0≤c≤1, and 0≤d<0.3, and M$^2$ is at the group consisting of P, B, C, Al, Sc, Sr, Ti, V, Zr, Mn, Fe, Co, Cu, Zn, Cr, Mg, Nb, Mo and Cd);

$$LiM^3_eMn_{1-e}O_2 \quad \text{[Formula 3]}$$

(wherein e is 0≤e<0.5, and M$^3$ is at least one element selected from the group consisting of Cr, Al, Ni, Mn and Co);

$$Li_2M^4O_2 \quad \text{[Formula 4]}$$

wherein M$^4$ is at least one element selected from the group consisting of Cu and Ni;

$$Li_{3+f}Nb_{1-g}M^5_gS_{4-h} \quad \text{[Formula 5]}$$

wherein −0.1≤f≤1, 0≤g≤0.5, and −0.1≤h≤0.5, and M$^5$ is at least one element selected from the group consisting of Mn, Fe, Co, Cu, Zn, Mg and Cd);

$$LiM^6_iMn_{1-i}O_2 \quad \text{[Formula 6]}$$

wherein i is 0.05≤i<0.5, and M$^6$ is at least one group consisting of Cr, Al, Ni, Mn, and Co);

$$LiM^7_{2j}Mn_{2-2j}O_4 \quad \text{[Formula 7]}$$

wherein j is 0.05≤j<0.5, and M$^7$ is at least one element selected from the group consisting of Cr, Al, Ni, Mn, and Co);

$$Li_k-M^8_m-N_n \quad \text{[Formula 8]}$$

wherein M$^8$ is an alkaline earth metal, k/(k+m+n) is 0.10 to 0.40, m/(k+m+n) is 0.20 to 0.50, n/(k+m+n) is 0.20 to 0.50.

8. The lithium secondary battery of claim 1, wherein the lithium metal is a metal layer having a thickness of 1 μm to 50 μm.

9. The lithium secondary battery of claim 5, wherein the protective layer comprises at least one of a lithium ion conductive polymer and an inorganic solid electrolyte.

10. The lithium secondary battery of claim 9, wherein the protective layer comprises the lithium ion conductive polymer, which comprises at least one selected from the group consisting of polyethylene oxide (PEO), polyacrylonitrile (PAN), polymethylmethacrylate (PMMA), polyvinylidene fluoride (PVDF), polyvinylidene fluoride-hexafluoropropylene (PVDF-HFP), LiPON, Li$_3$N, LixLa$_{1-x}$TiO$_3$(0<x<1) and Li$_2$S—GeS—Ga$_2$S$_3$.

11. The lithium secondary battery of claim 9, wherein the protective layer comprises the inorganic solid electrolyte, which comprises at least one selected from the group consisting of Thio-LISICON (Li$_{3.25}$Ge$_{0.25}$P$_{0.75}$S$_4$), Li$_2$S—SiS$_2$, LiI—Li$_2$S—SiS$_2$, LiI—Li$_2$S—P$_2$S$_5$, LiI—Li$_2$S—P$_2$O$_5$, LiI—Li$_3$PO$_4$—P$_2$S$_5$, Li$_3$PS$_4$, Li$_7$P$_3$S$_{11}$, Li$_2$O—B$_2$O$_3$, Li$_2$O—B$_2$O$_3$—P$_2$O$_5$, Li$_2$O—V$_2$O$_5$—SiO$_2$, Li$_2$O—B$_2$O$_3$, Li$_3$PO$_4$, Li$_2$O—Li$_2$WO$_4$—B$_2$O$_3$, LiPON, LiBON, Li$_2$O—

$SiO_2$, LiI, $Li_3N$, $Li_5La_3Ta_2O_{12}$, $Li_7La_3Zr_2O12$, $Li_6BaLa_2Ta_2O_{12}$, $Li_3PO_{(4-3/2w)}Nw$ (w is w<1), and $Li_{3.6}Si_{0.6}P_{0.4}O_4$.

12. The lithium secondary battery of claim 9, wherein the protective layer further comprises at least one lithium salt selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic carboxylic acid lithium, 4-phenyl-boric acid lithium, and lithium imide.

13. The lithium secondary battery of claim 9, wherein the protective layer has a thickness of 10 nm to 50 μm.

* * * * *